United States Patent
Yang et al.

(10) Patent No.: US 12,492,321 B2
(45) Date of Patent: Dec. 9, 2025

(54) MANUFACTURING METHOD OF ELASTIC PAINT

(71) Applicant: ASUSTEK COMPUTER INC., Taipei (TW)

(72) Inventors: Guo Lin Yang, Taipei (TW); Po-Wen Huang, Taipei (TW); Yu-Chun Yang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 586 days.

(21) Appl. No.: 18/076,211

(22) Filed: Dec. 6, 2022

(65) Prior Publication Data
US 2023/0383138 A1 Nov. 30, 2023

(30) Foreign Application Priority Data
May 24, 2022 (TW) .................................. 111119334

(51) Int. Cl.
*C09D 169/00* (2006.01)
(52) U.S. Cl.
CPC .................................. *C09D 169/00* (2013.01)
(58) Field of Classification Search
CPC .......................... C09D 169/00; C08L 2205/03
See application file for complete search history.

(56) References Cited

FOREIGN PATENT DOCUMENTS

| CN | 102120911 A | 7/2011 |
|---|---|---|
| CN | 107189746 B | 6/2020 |
| CN | 113416503 A | 9/2021 |
| CN | 112375200 A | 12/2021 |
| JP | 6364604 B1 * | 8/2018 |

OTHER PUBLICATIONS

Yoshino, JP6364604-MT (Year: 2018).*

* cited by examiner

*Primary Examiner* — Mark Eashoo
*Assistant Examiner* — Zhen Liu
(74) *Attorney, Agent, or Firm* — MUNCY, GEISSLER, OLDS & LOWE, P.C.

(57) ABSTRACT

A manufacturing method of an elastic paint is provided. The manufacturing method includes: blending an original composition to produce a first rough painting material, where the original composition includes polycarbonatediol (PCDL), a polyurethane (PU) elastic powder, poly(methyl methacrylate) (PMMA), a photoinitiator, a wetting agent, a solvent, and an auxiliary agent; carrying out precipitation treatment on the first rough painting material, and filtering the treated first rough painting material, to produce a second rough painting material; blending the second rough painting material; sealing the blended second rough painting material to produce a plurality of layers in the second rough painting material; removing an upper portion and a lower portion from the layers to produce a main ingredient; and adding a curing agent and a diluent into the main ingredient to produce an elastic paint.

11 Claims, 3 Drawing Sheets

MANUFACTURING METHOD OF ELASTIC PAINT

CROSS-REFERENCE TO RELATED APPLICATION

This application claims the priority benefit of Taiwan Application No. 111119334, filed on May 24, 2022. The entirety of the above-mentioned patent application is hereby incorporated by reference herein and made a part of specification.

BACKGROUND OF THE INVENTION

Field of the Invention

The disclosure relates to coating technologies, and in particular, to a manufacturing method of an elastic paint.

Description of the Related Art

Generally, conventional elastic resins can only make the surface of an object feel thick, but have relatively poor physical properties, such as abrasion resistance, surface hardness, and blocking resistance. In addition, membrane structures formed from conventional elastic resins generally can only feel thick and silky, but cannot provide an abrasive feel.

BRIEF SUMMARY OF THE INVENTION

The disclosure provides a manufacturing method of an elastic paint. The manufacturing method includes: blending an original composition to produce a first rough painting material, where the original composition includes polycarbonatediol (PCDL), a polyurethane (PU) elastic powder, poly(methyl methacrylate) (PMMA), a photoinitiator, a wetting agent, a solvent, and an auxiliary agent; carrying out precipitation treatment on the first rough painting material, and filtering the treated first rough painting material, to produce a second rough painting material; blending the second rough painting material; sealing and storing the blended second rough painting material to layer the blended second rough painting material as a plurality of layers; removing an upper portion and a lower portion from the layers to produce a main ingredient; and adding a curing agent and a diluent into the main ingredient to produce an elastic paint.

The elastic paint manufactured by the manufacturing method in the disclosure bears up to 150 abrasion cycles in RCA abrasion testing, has a hardness level of 2H to 7H, and also maintains a thick and silky feel and an abrasive feel of the coating membrane itself. In addition, the coating surface has various shades of resin particles arranged, which produces a color effect of shining points and a fluffy effect. Moreover, the elastic paint manufactured by the manufacturing method in the disclosure withstands a 500 hours UV weathering test, and maintains the blocking resistance for a long time.

DETAILED DESCRIPTION OF THE EMBODIMENTS

More detailed descriptions of the specific embodiments of the disclosure are provided below with reference to the accompanying drawings. The features and advantages of the disclosure are described more clearly according to the following description and claims. It is to be noted that all of the drawings use very simplified forms and imprecise proportions, only being used for assisting in conveniently and clearly explaining the objective of the embodiments of the disclosure.

Figure 1:
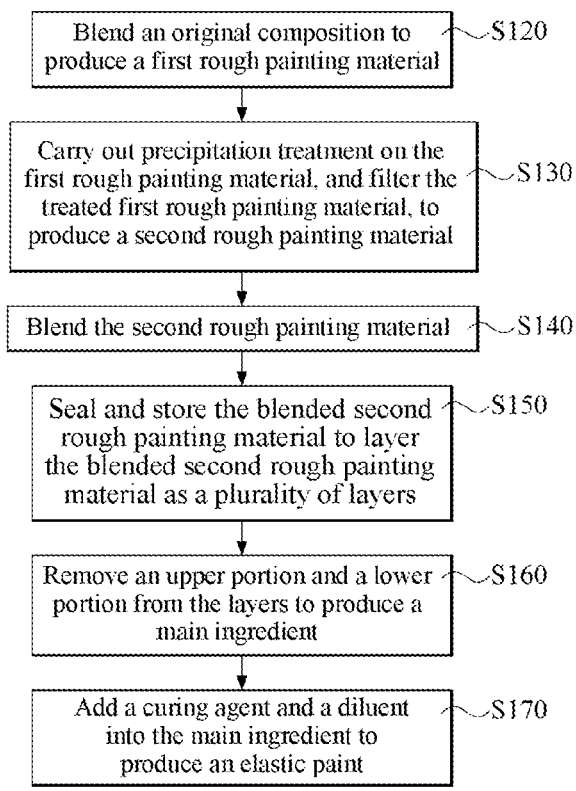
FIG. 1 is a flowchart of a manufacturing method of an elastic paint according to an embodiment of the disclosure.

FIG. 1 is a flowchart of a manufacturing method of an elastic paint according to an embodiment of the disclosure.

The disclosure provides a manufacturing method of an elastic paint. The manufacturing method includes the following steps.

First, as described in step S120, blend an original composition to produce a first rough painting material.

The original composition includes polycarbonatediol (PCDL), a polyurethane (PU) elastic powder, poly(methyl methacrylate) (PMMA), a photoinitiator, a wetting agent, a solvent, and an auxiliary agent.

PCDL is a main ingredient in the original composition and provides an elastic effect and a fluffy and abrasive effect on the surface. In an embodiment, PCDL is in a range of 50% to 69% in percentage by weight in the original composition.

The PU elastic powder is mainly used for providing an elastic effect. The PU elastic powder is in a range of 3.5% to 6.5% in percentage by weight in the original composition. In an embodiment, a particle size of the PU elastic powder is in a range of 10 μm to 100 μm. The particle size of the PU elastic powder is also adjusted according to different feels required. Basically, a larger particle size of the PU elastic powder indicates a larger surface roughness of the elastic paint.

PMMA is used for providing special effects to the elastic paint, such as abrasion resistance, chemical resistance, quick drying, and anti-peeling. In an embodiment, PMMA is in a range of 8% to 15% in percentage by weight in the original composition.

In this embodiment, the photoinitiator is used for replacing a conventional flatting agent to provide an extinction effect. In addition, in order to dissolve the photoinitiator in the painting material uniformly, in an embodiment, the photoinitiator in the original composition includes a first photoinitiating ingredient and a second photoinitiating ingredient. The proportion of the first photoinitiating ingredient is lower than that of the second photoinitiating ingredient. The first photoinitiating ingredient is used as a photoinitiator in a top layer, and the second photoinitiating ingredient is used as a photoinitiator in a bottom layer.

In this case, during blending, the first photoinitiating ingredient and the second photoinitiating ingredient are effectively distributed at an upper portion and a lower portion of the original composition respectively, so as to improve the uniformity of the photoinitiator in the painting material. In an embodiment, the first photoinitiating ingredient is in a range of 2% to 4% in percentage by weight in the original composition, and the second photoinitiating ingredient is in a range of 1% to 5% in percentage by weight in the original composition.

The wetting agent is used for reducing the surface tension and improving the coating effect of the painting material. The solvent is used for assisting in mixing the ingredients in the original composition. The auxiliary agent includes a dispersing agent, a painting medium, and the like. The proportions of these ingredients are adjusted according to actual needs.

Figure 2:
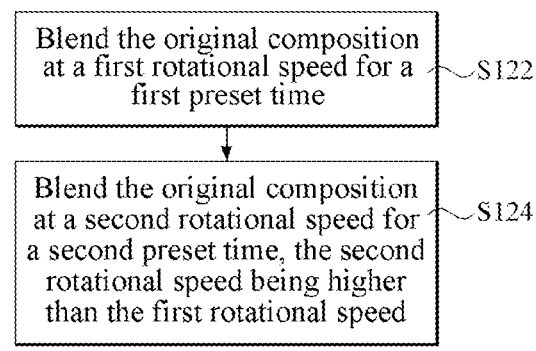
FIG. 2 is a flowchart of an embodiment of step S120 in FIG. 1.

Referring to FIG. 2 together, FIG. 2 is a flowchart of an embodiment of step S120 in FIG. 1. To improve the mixing effect, in an embodiment of the disclosure, stirring at a high rotational speed and stirring at a low rotational speed are used in combination. As shown in FIG. 2, the foregoing step of blending an original composition to produce a first rough painting material includes the following steps.

First, as described in step S122, blend the original composition at a first rotational speed for a first preset time, the first rotational speed being in a range of 500 RPM to 800 RPM.

Then, as described in step S124, blend the original composition treated in step S122 at a second rotational speed for a second preset time, the second rotational speed being higher than the first rotational speed. In an embodiment, the second rotational speed is higher than 1200 RPM, such as 1500 RPM.

In an embodiment, the second preset time is greater than the first preset time. In an embodiment, the first preset time is in a range of 10 hours to 12 hours, and the second preset time is in a range of 16 hours to 18 hours.

Then, as described in step S130, carry out precipitation treatment on the first rough painting material, and filter the treated first rough painting material, to produce a second rough painting material.

In an embodiment, the foregoing step of carrying out precipitation treatment on the first rough painting material includes carrying out precipitation treatment on the first rough painting material for a third preset time, and in this step of precipitation treatment, the first rough painting material will be exposed to air and impurities will be precipitated. In an embodiment, the third preset time is 24 hours. The third preset time is adjusted in a range of 12 hours to 36 hours according to different material ingredients.

In an embodiment, the foregoing step of filtering the treated first rough painting material includes extruding the first rough painting material through a filter by air pressure. In an embodiment, the filter is a 1000-mesh filter.

Then, as described in step S140, blend the second rough painting material. In an embodiment, step S140 includes blending the original composition at a third rotational speed for a fourth preset time. In an embodiment, the third rotational speed is equal to the second rotational speed, and the fourth preset time is less than the second preset time. In an embodiment, the fourth preset time is in a range of 6 hours to 8 hours.

Then, as described in step S150, seal and store the blended second rough painting material to layer the blended second rough painting material as a plurality of layers. These layers include at least an upper portion, a middle portion, and a lower portion. Different from the precipitation treatment in step S130, in this step of sealing, the second rough painting material will be preserved in isolation from air in a low temperature and low humidity environment. In an embodiment, this step of sealing is carried out for 24 hours at a temperature in a range of 18° C. to 22° C. and a humidity ≤35%. The sealed second rough painting material is preserved for a long time.

After the foregoing step of sealing, some dirt easily floats on the top layer of the painting material, and a precipitate is easily produced on the bottom layer of the painting material. When the elastic paint is required, as described in step S160, remove an upper portion and a lower portion from the layers to produce a main ingredient. In an embodiment, the upper portion is in a range of 3% to 6% in percentage by weight in the second rough painting material, and the lower portion is in a range of 10% to 15% in percentage by weight in the second rough painting material.

Then, as described in step S170, add a curing agent and a diluent into the main ingredient to produce an elastic paint for use. In an embodiment, in the elastic paint, the main ingredient, the curing agent, and the diluent is in a ratio of 10:(1.5-2):(3-5). In an embodiment, a dispersing machine is required in step S170 at a rotational speed of 800-1000 RPM to mix the ingredients uniformly.

Figure 3:
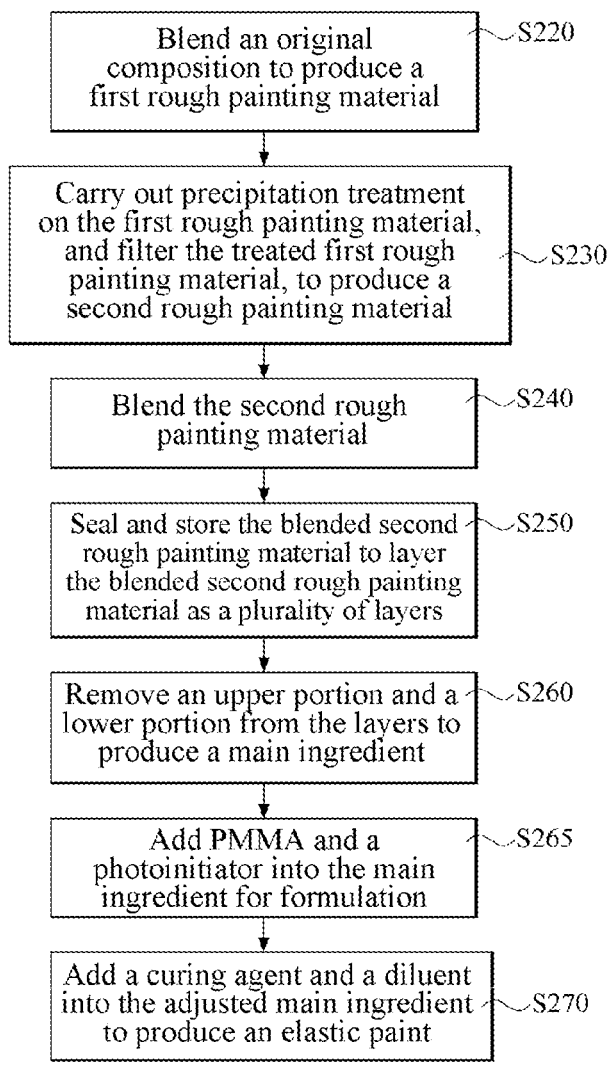
FIG. 3 is a flowchart of a manufacturing method of an elastic paint according to another embodiment of the disclosure.

FIG. 3 is a flowchart of a manufacturing method of an elastic paint according to another embodiment of the disclosure.

Compared with the embodiment in FIG. 1, in this embodiment, the original composition does not include PMMA and a photoinitiator. For the original composition, steps S220 to S260 is similar to the steps S120 to S160 in the embodiment in FIG. 1. Details are not described herein.

After the main ingredient is obtained, as described in step S265, add PMMA and a photoinitiator into the main ingredient for formulation. In this case, the PMMA and the photoinitiator are added into the same main ingredient according to needs for adjustment in cooperation to obtain elastic paints with different properties.

Then, as described in step S270, add a curing agent and a diluent into the adjusted main ingredient to produce an elastic paint.

The elastic paint manufactured by the manufacturing method in the disclosure bears up to 150 abrasion cycles in RCA abrasion testing, has a hardness level of 2H to 7H, and also maintains a thick and silky feel and an abrasive feel of the coating membrane itself. In addition, the coating surface has various shades of resin particles arranged, which produces a color effect of shining points and a fluffy effect. Moreover, the elastic paint manufactured by the manufacturing method in the disclosure withstands a 500 hours UV weathering test, and maintains the blocking resistance for a long time.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure still fall within the content of the technical means of the disclosure and the protection scope of the disclosure.

What is claimed is:

1. A manufacturing method of an elastic paint, comprising:
   blending an original composition to produce a first rough painting material, wherein the original composition comprises polycarbonatediol (PCDL), a polyurethane (PU) elastic powder, poly(methyl methacrylate) (PMMA), a photoinitiator, a wetting agent, a solvent, and an auxiliary agent;
   carrying out precipitation treatment on the first rough painting material, and filtering the treated first rough painting material, to produce a second rough painting material;
   blending the second rough painting material;

sealing and storing the blended second rough painting material to layer the blended second rough painting material as a plurality of layers;

removing an upper portion and a lower portion from the layers to produce a main ingredient; and adding a curing agent and a diluent into the main ingredient to produce the elastic paint.

2. The manufacturing method according to claim 1, wherein the step of blending the original composition to produce the first rough painting material comprises:

blending the original composition at a first rotational speed for a first preset time, the first rotational speed being in a range of 500 RPM to 1000 RPM; and blending the original composition at a second rotational speed for a second preset time, the second rotational speed being higher than the first rotational speed.

3. The manufacturing method according to claim 2, wherein the second rotational speed is higher than 1200 RPM.

4. The manufacturing method according to claim 2, wherein the second preset time is greater than the first preset time.

5. The manufacturing method according to claim 4, wherein the first preset time is in a range of 10 hours to 12 hours, and the second preset time is in a range of 16 hours to 18 hours.

6. The manufacturing method according to claim 1, wherein the step of carrying out precipitation treatment on the first rough painting material comprises carrying out precipitation treatment on the first rough painting material for a third preset time, the third preset time being 24 hours.

7. The manufacturing method according to claim 1, wherein the photoinitiator comprises a first photoinitiating ingredient and a second photoinitiating ingredient in different proportions.

8. The manufacturing method according to claim 1, wherein a particle size of the PU elastic powder is in a range of 10 μm to 100 μm.

9. The manufacturing method according to claim 1, wherein the PCDL is in a range of 50% to 69% in percentage by weight in the original composition.

10. The manufacturing method according to claim 1, wherein the upper portion is in a range of 3% to 6% in percentage by weight in the second rough painting material, and the lower portion is in a range of 10% to 15% in percentage by weight in the second rough painting material.

11. The manufacturing method according to claim 1, wherein the main ingredient, the curing agent, and the diluent is in a ratio of 10:(1.5-2):(3-5).

* * * * *